(12) United States Patent
Hart

(10) Patent No.: US 8,721,199 B1
(45) Date of Patent: *May 13, 2014

(54) SLIDE-ABLE MOUNT FOR AN IMAGE DEVICE

(71) Applicant: Kyle Hart, Puyallup, WA (US)

(72) Inventor: Kyle Hart, Puyallup, WA (US)

(73) Assignee: Rhino Camera Gear, LLC, Puyallup, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,311

(22) Filed: Aug. 23, 2013

Related U.S. Application Data

(63) Continuation of application No. 13/947,220, filed on Jul. 22, 2013, and a continuation-in-part of application No. 29/457,283, filed on Jun. 7, 2013.

(51) Int. Cl.
*G03B 17/00* (2006.01)
*G03B 17/56* (2006.01)

(52) U.S. Cl.
CPC .................................. *G03B 17/56* (2013.01)
USPC ........................................................ 396/428

(58) Field of Classification Search
USPC ........................................................ 396/428
See application file for complete search history.

(56) References Cited

U.S. PATENT DOCUMENTS

| | | | | |
|---|---|---|---|---|
| 6,022,168 A | * | 2/2000 | Junker | 404/6 |
| 6,035,794 A | * | 3/2000 | Keeton | 112/475.07 |
| 7,891,888 B2 | | 2/2011 | Wood | |
| 8,142,019 B2 | * | 3/2012 | Hernandez | 352/243 |
| 8,584,995 B2 | * | 11/2013 | Russell | 248/177.1 |
| 2003/0116331 A1 | * | 6/2003 | Boyl-Davis et al. | 173/1 |
| 2007/0163412 A1 | * | 7/2007 | Baratta et al. | 83/651 |
| 2009/0268993 A1 | * | 10/2009 | Tsai | 384/7 |
| 2012/0288269 A1 | * | 11/2012 | Jensen | 396/428 |

OTHER PUBLICATIONS

Ginirigs G8 Slider, www.ginirigs.com.

* cited by examiner

*Primary Examiner* — Clayton E LaBalle
*Assistant Examiner* — Dennis Hancock
(74) *Attorney, Agent, or Firm* — Pugent Patent; Michael Gibbons

(57) ABSTRACT

A camera slider system that supports a camera for longitudinal sliding. The camera sliding system comprises a pair of longitudinal rail members and a carriage system. The rail members are spaced at a substantially constant distance apart. The carriage system further comprises of a base plate upon which a camera mounting plate is fixed, along with a pair of wheel support assemblies. Each wheel support assembly engages the corresponding rail member to support longitudinal movement. Each wheel assembly further comprises of three rollers, wherein two rollers engage the interior surface of the corresponding rail member, and one roller engages the exterior surface of the same rail member. The arrangement of rollers is coplanar with the plane of the rail members. The exterior roller of each wheel assembly is adjustable relative to the corresponding rail member to accommodate any flaw in the rail profile.

21 Claims, 7 Drawing Sheets

SLIDE-ABLE MOUNT FOR AN IMAGE DEVICE

PRIORITY CLAIM

This application constitutes a continuation application of U.S. patent application Ser. No. 13/947,220, entitled SLIDE-ABLE MOUNT FOR AN IMAGE DEVICE (our ref. RHNO-1-1001-1), naming KYLE HART as inventor, filed Jul. 22, 2012, which is currently co-pending, and further claims priority from design patent application No. 29/457,283 filed Jun. 7, 2013. The foregoing applications are hereby incorporated by reference in its their entirety as if fully set forth herein.

FIELD OF THE INVENTION

The present invention relates to a camera slider system comprising a carriage system arranged to support a camera device thereon for movement along a pair of longitudinal rail members. More particularly, the present invention relates to a camera slider system in which the carriage system further comprises of a plurality of adjustable track rollers that allow the carriage system to operate smoothly over a flaw in a rail member profile.

SUMMARY

This invention relates generally to moveable camera slider systems, and more particularly, to a camera slider system for low profile camera mountings that enables longitudinal and/or rolling movement. The present invention comprises of a pair of longitudinal rail members, which are spaced at a substantially constant distance apart, and a carriage system. The carriage system further comprises of a camera mounting plate upon which a camera is mounted; and, a pair of wheel support assemblies, which support the carriage system on the rail members. Each wheel support assembly further comprises of three track rollers, which engage the adjacent corresponding rail member. The three track rollers are disposed in a triangular planar arrangement, coplanar with the two rail members wherein two track rollers engage the interior surface of a corresponding rail member and the third track roller engages the exterior surface of the same rail member. The exterior track rollers are laterally adjustable relative to each corresponding rail member so as to accommodate any flaw in the rail member profile.

In addition to the forgoing, various other system embodiments are set forth and described in the teachings such as the text (e.g. claims, drawings, and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or other subject matter described herein will become apparent in the teachings set forth herein.

BACKGROUND

When filming with a video camera it is common to provide a mounting system to support the camera body. Dolly and track systems allow camera operators to perform swift movements of the camera when filming moving objects and to avoid the shakiness that is inherent in moving a handheld camera. Known dolly constructions however are generally quite large and expensive.

U.S. Pat. No. 7,891,888 by Wood discloses an example of a Camera Sliding System for mounting a camera on elongated support members. The camera-mount however, is complex in configuration and lacks a means of adjusting the lateral position of the carriage track rollers relative to the rail members. The ability to adjust the track roller is advantageous when a flaw in the rail member profile is present and would inhibit the smooth movement of the carriage system over the rail members. Previous inventions have imposed strict manufacturing tolerances on the rail members to limit the possibility of inherent flaws. However, strict manufacturing tolerances lead to higher manufacturing costs, thus limiting the product's commercial appeal.

More recently, another example of a camera mounting system is the Ginirigs G8 Slider, which can be found at www.ginirigs.com. The G8 Slider also has a carriage system mounted on elongated rail members, however the planar arrangement of the rollers does not allow of any lateral adjustment of the rollers to account for a flaw in the rail member profile. As a result, to guarantee smooth movement of the carriage system, the Ginirigs G8 Slider rail members also requires strict manufacturing tolerances to limit the possibility of inherent flaws.

BRIEF DESCRIPTION OF THE DRAWINGS

Embodiments of the present invention are described in detail below with the following drawings.

DETAILED DESCRIPTION

Figure 1:
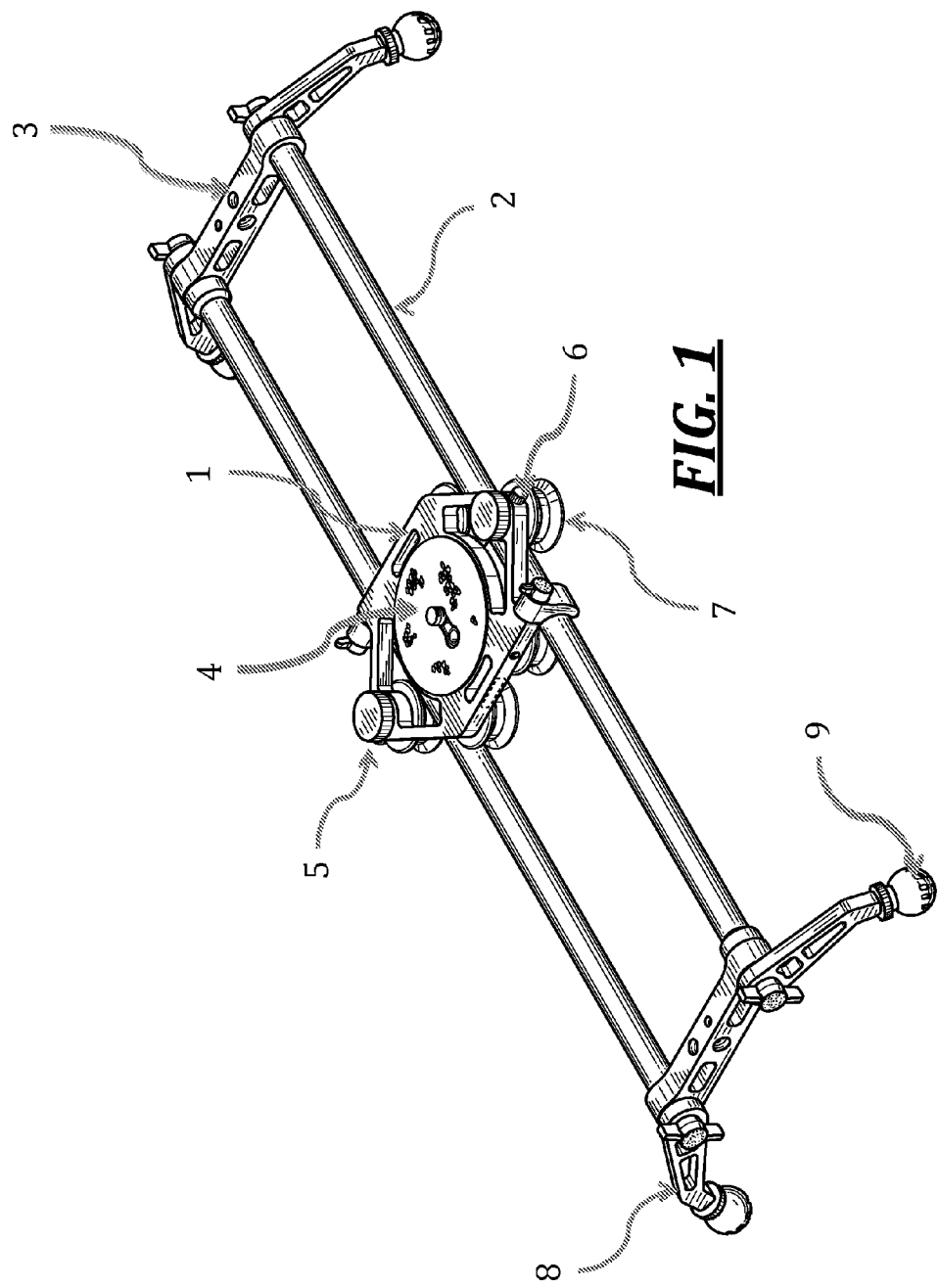
FIG. 1 is an isometric view of a Slide-able Mount for an image device, in accordance with an embodiment of the invention.
Figure 2:
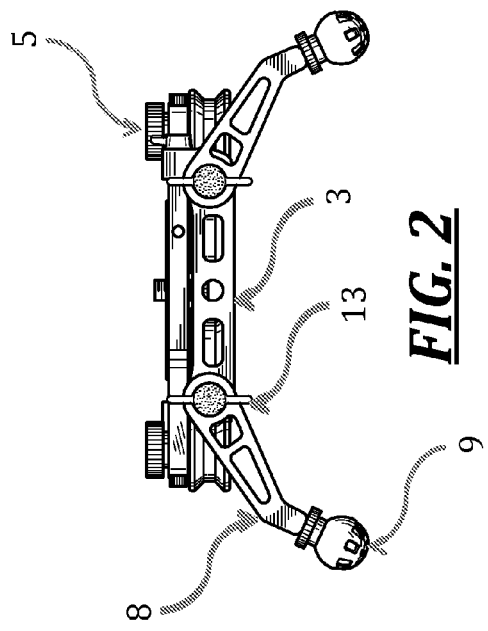
FIG. 2 is a left end side view thereof, in accordance with an embodiment of the invention.
Figure 3:
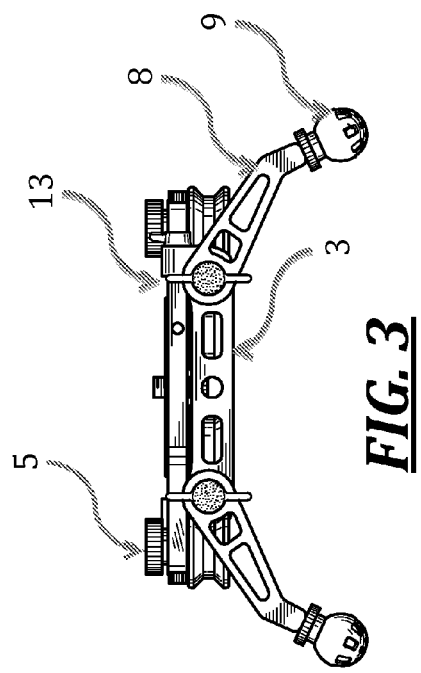
FIG. 3 is a right end side view thereof, in accordance with an embodiment of the invention.
Figure 4:
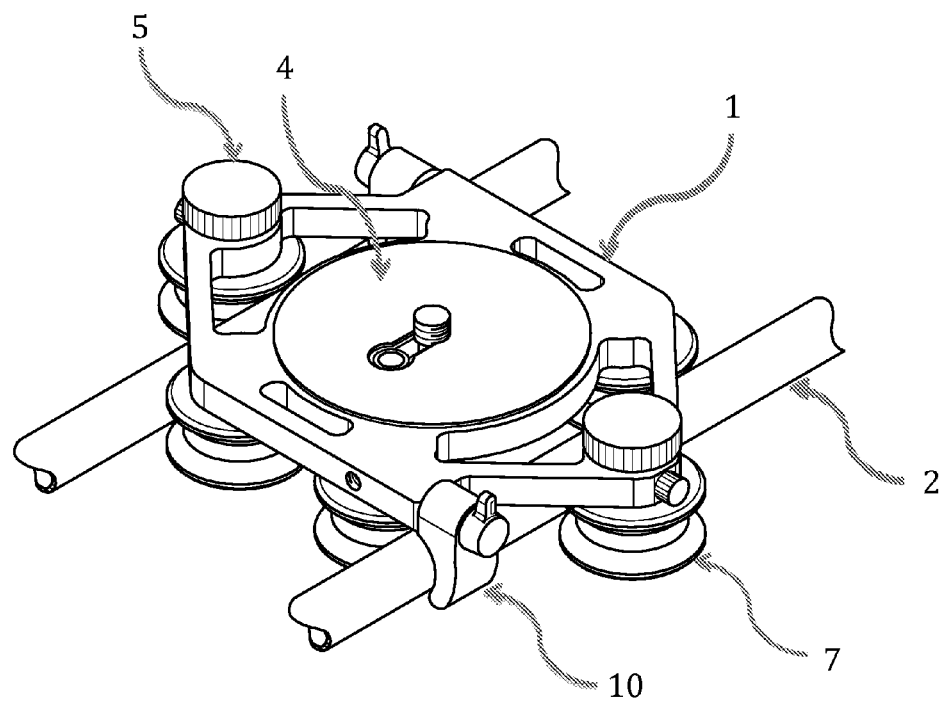
FIG. 4 is an isometric view of the carriage system for the Slide-able Mount, in accordance with an embodiment of the invention.
Figure 5:
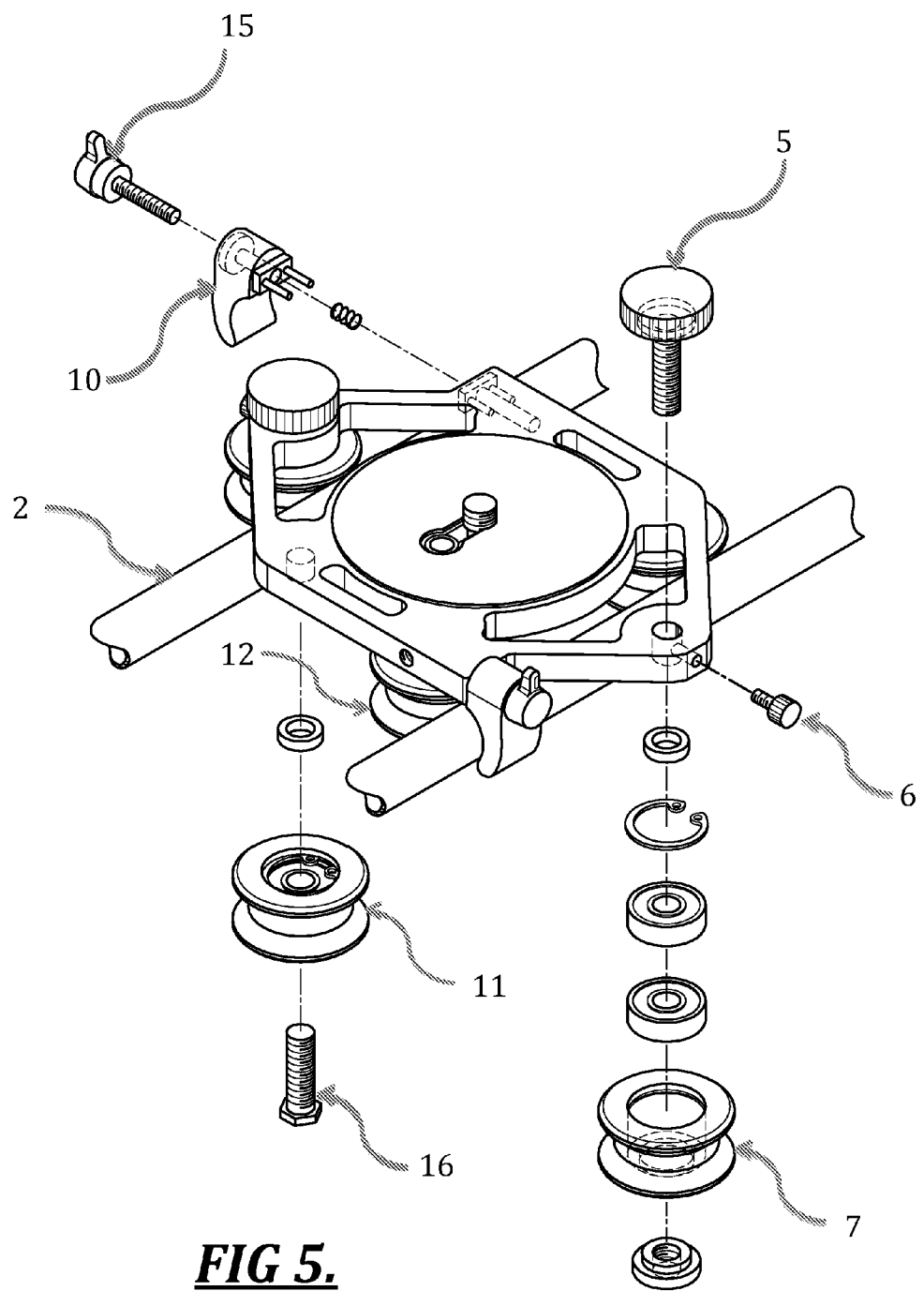
FIG. 5 is an isometric exploded view of the carriage system, in accordance with an embodiment of the invention.
Figure 6:
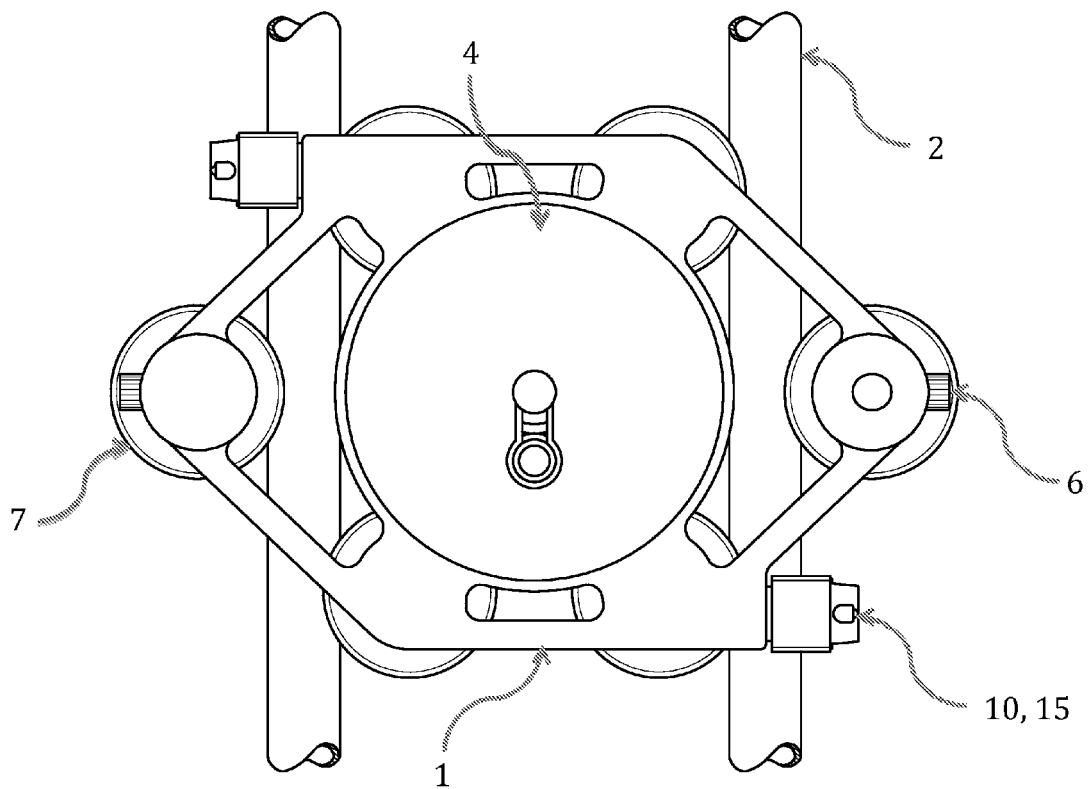
FIG. 6 is a top plan view of the carriage system, in accordance with an embodiment of the invention.
Figure 7:
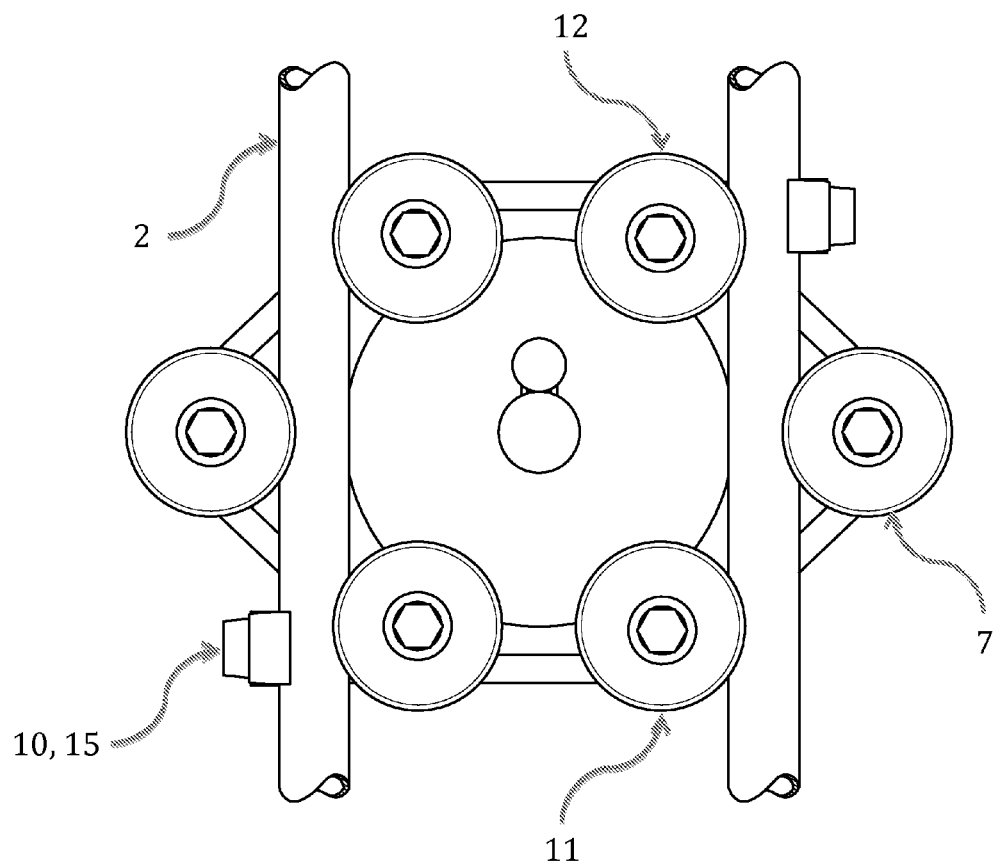
FIG. 7 is a bottom view of the carriage system, in accordance with an embodiment of the invention.
Figure 8:
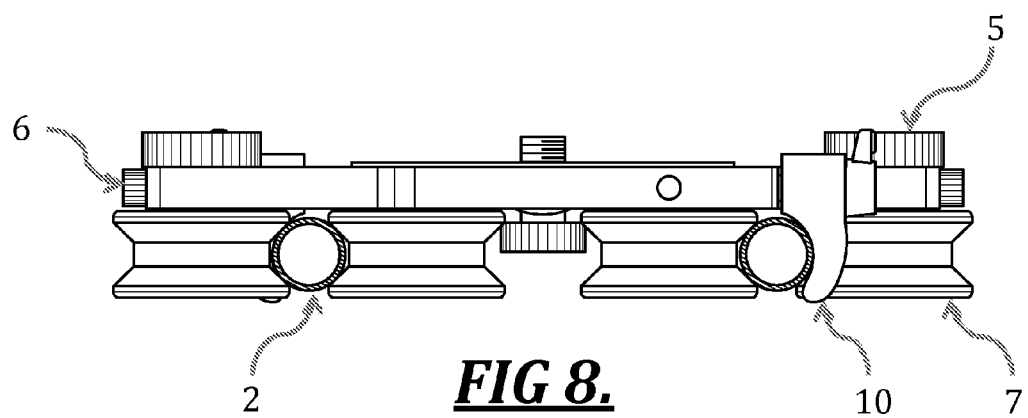
FIG. 8 is a left end side view of the carriage system, in accordance with an embodiment of the invention.
Figure 9:
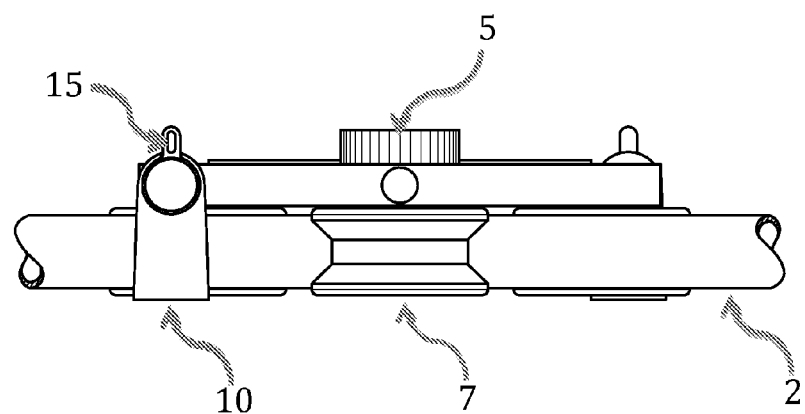
FIG. 9 is a left side view of the carriage system, in accordance with an embodiment of the invention.

This invention relates generally to moveable slider systems for camera devices, and more particularly, to slider systems mounted on track assemblies. Specific details of certain embodiments of the invention are set forth in the following description and in FIGS. 1-9 to provide a thorough understanding of such embodiments. The present invention may have additional embodiments, may be practiced without one or more of the details described for any particular described embodiment, or may have any detail described for one particular embodiment practiced with any other detail described for another embodiment.

The present invention provides a carriage system and track assembly configured to enable low profile camera mountings.

The carriage system is configured to receive a camera device on a mounting plate, 4, and is moveable in the longitudinal direction along the track assembly. The track assembly comprises of a first and second rail member, 2. The first and second rail members, 2, are further mounted onto four pivot legs, 8, positioned at each of the four corners of the track assembly. The pivot legs, 8, allow an operator to adjust the plane of the track assembly, wherein the plane is defined by the first and second rail members, 2. The pivot legs, 8, are attached to the track assembly through an adjoining endplate, 3, and are independently adjustable in two places to allow for rotational and translational movement.

The first and second rail members, 2, are spaced at a substantially constant distance apart. The rail members, 2, are rigid rails, or rods, which extend in the longitudinal direction. In the present embodiment, the two rail members, 2, are typically straight in the longitudinal direction and have a circular cross section. In the present embodiment, the rail members are fabricated using an aluminum alloy. In another embodiment, the rail members may retain some curvature in the longitudinal direction. In yet another embodiment, the rail members may be formed using stainless steel or other stronger materials when used with heavier camera equipment. In yet another embodiment, the rail members may comprise of carbon fiber material.

In the present embodiment, to reduce the cost of manufacture, the rail members may be formed without adhering to strict manufacturing tolerances of 0.050-in or less. The ease in manufacturing tolerance is allowed by the inclusion of an adjustable track roller 7 in each wheel assembly of the carriage system. The adjustable track roller, 7, allows for lateral adjustment of the wheel assembly relative to each corresponding rail member, 2, so as to accommodate any flaw in the rail member profile such as a rail member, 2, exceeding the manufacturing tolerance of 0.050-in.

In another embodiment, the adjustable track roller may allow for lateral adjustment of the wheel assembly to accommodate a flaw in the rail member profile that exceeds a manufacturing tolerance other than 0.050-in.

In its most basic embodiment, the camera slider system comprises of a carriage system upon which a camera is mounted. The carriage system is designed to facilitate the sliding movement of the camera along the rail members, 2. The carriage system comprises of a machined base plate, 1, wherein each of the following is installed: a camera mounting plate 4, a first and second wheel-support assembly, and a first and second brake leg assembly, 10. In the present embodiment, the baseplate, 1, is machined from a single piece of aluminum. The baseplate, 1, further comprises of a plurality of openings designed to reduce the weight of the assembly.

In the present embodiment, the camera mounting plate, 4 is substantially flat to suit a fluid head camera. In another embodiment, the camera mounting plate may be substantially spherical to accommodate a 75 mm bowl.

In its most basic embodiment, the carriage system comprises of a first and second wheel support assembly that engage the corresponding first and second rail members, 2. Each wheel support assembly supports the carriage system on a corresponding rail member, 2, by the use of three track rollers, 7, 11, 12. In the present embodiment, the three track rollers 7, 11, 12, are configured in a triangular planar arrangement. Two track rollers, 11, 12, engage the interior surface of each corresponding rail member, 2, and one track-roller, 7, engages the exterior surface of the same rail member, 2. The arrangement of the three track rollers, 7, 11, 12, is coplanar with the plane of the rail members, 2. This configuration means that the entire camera slider system remains relatively compact.

In the present embodiment of each wheel support assembly, the two track rollers, 11, 12, which engage the interior surface of the rail members, 2, are fixed to the underside of the carriage system baseplate, 1, by means of a threaded fastener that is disposed through each track roller, 11, 12. Internal threads are machined into the underside of the baseplate, 1, to receive each of the two track roller fasteners, 16. The internal threads are required to ensure the top surface of the baseplate, 1, is flush to receive the camera mounting plate, 4. This arrangement ensures the carriage system remains relatively compact.

In the present embodiment of each wheel support assembly, the track roller 7 that engages the exterior surface of each corresponding rail member, 2, may be laterally displaced relative to each rail member, 2, to accommodate an inherent flaw in the rail member profile. This exterior track roller, 7, identified as the "adjustable track roller" hereafter, is installed onto the carriage system baseplate, 1, by a knurled thumbwheel, 5, which is disposed through an elongated mounting hole in the carriage system baseplate, 1. The elongated dimension of the hole is oriented in the lateral direction towards the corresponding rail member, 2, thus facilitating the lateral displacement of the adjustable track roller, 7. Tightening and loosening the knurled thumbwheel, 5, acts to increase and decrease the friction force between the adjustable track roller 7 and baseplate 1, respectively. An increase in friction force locks the lateral position of adjustable track roller 7 in place. An advantage of the present invention is that the adjustable track roller, 7, can be displaced laterally away from a flawed rail member, allowing the carriage system to move uninhibited across a flaw in a rail member profile. In addition, by moving the adjustable track roller 7 away from or towards each corresponding rail member, 2, an operator can control the speed at which the carriage system moves along the rail members. In the present embodiment, each wheel support assembly further comprises of a setscrew, 6, operable to laterally move the adjustable track roller, 7, towards the corresponding rail member, 2. Internal threads are machined into the carriage system baseplate, 1, to receive the setscrews, 6. The setscrew, 6, is positioned to interface with the centerline of the knurled thumbwheel shaft 5. The setscrew, 6, provides an additional means of moving the adjustable track roller, 7, towards the corresponding rail member, 2.

In the present embodiment, the carriage assembly further comprises of a first and second brake leg, 10, which is designed to impede the longitudinal movement of the carriage system along the rail members, 2. The brake legs, 10, are laterally disposed on the carriage system adjacent to each rail member, 2. Each brake leg, 10, is designed to impede the longitudinal movement of the carriage system by generating a friction force between the brake leg surface and the mating rail member surface. The interior surface of the brake leg, 10, is geometrically contoured to match the exterior surface of the corresponding rail member, 2. In the present invention, the interior surface of the brake leg is circular. The brake leg, 10, is operable by tightening or loosening a levered thumbwheel, 15, which secures the brake leg, 10, to the carriage system base plate, 1. Tightening the levered thumbwheel, 15, will act to move the brake leg, 10, laterally towards the corresponding rail member, 2. Once the brake leg, 10, contacts the corresponding rail member, 2, the friction between the brake leg, 10, and rail member surfaces acts to impede longitudinal movement of the carriage system. Loosening the levered thumbwheel, 15, will have the opposite effect, whereby the brake leg, 10, will move away from the rail member, 2, allowing the carriage system to move unimpeded along the rail members, 2.

In the present embodiment, the camera slider system comprises of two end plates, 3, which each connect to the common ends of the rail members, 2. The length of the end plates, 3, substantially determines the lateral spacing between the rail members, 2. Each end plate, 3, has a plurality of ⅜-inch and ¼-inch threaded holes to accommodate mounting of additional camera accessories, such as tripods. In addition, in order to receive the pivot legs, 8, the endplates, 3, and the rail members, 2, are drilled and tapped through the longitudinal axis of the rail members, 2.

In the present embodiment, the camera slider system further comprises of four pivot legs, 8, which are attached by a hinge coupling to the rail member endplates, 3. The pivot legs 8 are coupled to the endplates 3 at the endplate holes tapped through the longitudinal axis of the rail members, 2. As such, the pivot legs, 8, are designed to rotate about the longitudinal axis of each corresponding rail member, 2, which has the advantage of making the mounting assembly more compact when folded for storage. This design also reduces the cost of manufacture since the number of threaded fasteners to install the pivot legs 8 and endplates 3, is halved.

The four pivot legs 8 are independently adjustable in two places, namely at the pivot leg 8 and endplate 3 hinge coupling, and at the feet of each pivot leg. Major rotational adjustments can be made at the hinge coupling through a winged thumbwheel, 13. In the present embodiment, the pivot leg surface that mates with the rail member endplate incorporates a face gear pattern that is machined radially about the hinge-coupling axis. The endplate 3 incorporates a mating face gear pattern, machined radially about the same hinge-coupling axis. A sufficient mesh of the two gear patterns is designed to provide sufficient rotational fixity to support to the pivot leg in its prescribed rotational position. Rotational fixity of the pivot leg can be established by tightening the winged thumbwheel 13, which is disposed through hinge coupling axis between each pivot leg 8 and rail member endplate, 3. Tightening the winged thumbwheel 13 will act to clamp the pivot leg 8 against the rail member endplate 3 increasing the engagement of mating gear patterns.

Minor translational adjustments can also be made at the feet of the pivot legs 8 through a threaded ball joint assembly. In the present embodiment, a rubber ball 9 is threaded into the base of each pivot leg 8. Each rubber ball 9 incorporates a threaded stem that mates with an internal thread machined into the tip of each pivot leg. Increasing or decreasing the number of exposed threads between the pivot leg and rubber ball 9 acts to adjust the pivot leg 8 translational height.

In the present embodiment, at least one rubber bumper ring 14 is installed over each rail member 2 and is abutted against a rail member endplate 3. The rubber bumper ring 14 is required to cushion any contact between the carriage system and the rail member endplate 3 in cases where the carriage system brake is not set. In the present embodiment, one rubber bumper ring 14 is installed on diagonally opposite ends of the rail members 2 so as to cushion any carriage system contact with the rail member endplates 3 in both directions. In another embodiment, rubber bumper rings 14 may be installed at both ends of each rail member 2.

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

The invention claimed is:

1. A camera slider system for supporting a camera for longitudinal movement, the system comprising:
    a track assembly including at least a first and second rail member, the first and second rail member oriented longitudinally and spaced at a substantially constant distance apart; and
    a carriage system on which a camera may be mounted, the carriage system being supported for longitudinal movement along the first and second rail members wherein the carriage system includes at least a camera mounting plate at least partially disposed between the first and second rail member, a first wheel support assembly laterally spaced adjacent to the first rail member, and a second wheel support assembly laterally spaced adjacent to the second rail member, wherein the first and second wheel support assembly includes at least a plurality of rollers arranged such that the assembly of rollers is coplanar with the first and second rail members, wherein at least one roller adjacent to each of the first and second rail members includes at least a fastener disposed through the roller, the fastener interfacing with a setscrew.

2. A camera slider system as defined in claim 1, wherein the carriage system further comprises of a first and second brake leg, wherein the interior surface of the brake leg is geometrically contoured to match the exterior surface of the corresponding first and second rail member, and wherein the first and second brake leg is attached to the carriage system by a setscrew operable to laterally move the brake leg away from or towards the corresponding first and second rail member.

3. A camera slider system as defined in claim 1, wherein the carriage system comprises of a baseplate with which the first and second wheel support assembly are coupled.

4. A camera slider system as defined in claim 3, wherein the carriage system further comprises of a baseplate with which a first and second brake leg are coupled.

5. A camera slider system as defined in claim 1, which further comprises of four pivot legs, wherein two pivot legs are attached to opposing ends of the first rail member, and two pivot legs are attached to opposing ends of the second rail member.

6. A camera slider system as defined in claim 5, wherein each pivot leg further comprises of a hinge coupling between the leg and the corresponding end of the first and second rail members wherein the legs may pivot relative to one another about the longitudinal axis of the corresponding rail member.

7. A camera slider system as defined in claim 1, wherein the first and second wheel support assembly further comprises of exactly three rollers.

8. A camera slider system as defined in claim 1, wherein the first and second wheel support assembly further comprises of exactly two rollers that engage the interior surface of the corresponding first and second rail members and are coupled with the carriage system.

9. A camera slider system as defined in claim 1, wherein the first and second wheel support assembly further comprises of exactly one laterally adjustable roller that engages the exterior surface of the corresponding rail member.

10. A camera slider system as defined in claim 1, wherein the carriage system further comprises of two elongated mounting holes to receive rollers of the first and second wheel support assembly, wherein the elongated dimension of the hole is oriented in the lateral direction relative to the first and second rail members.

11. A camera slider system as defined in claim 1, wherein the first and second wheel support assembly further comprises of a setscrew operable to laterally move a roller away from or towards the corresponding first and second rail member.

12. A camera slider system as defined in claim 1, wherein the camera mounting plate is not coplanar with the first and second rail members.

13. A camera slider system as defined in claim 1, wherein at least some rollers are removably coupled with the carriage system.

14. A camera slider system as defined in claim 1, wherein one or more threaded holes for receiving at least one of camera accessories or a carrying strap are disposed through one or more portions of the camera slider system.

15. A camera slider system as defined in claim 1, wherein at least a portion of the camera mounting plate overlaps at least a portion of the first or second rail member.

16. A camera slider system as defined in claim 1, wherein the first wheel support assembly further comprises a first and a second roller coupled with the carriage system, the first and second roller engaging an interior surface of the first rail member, and wherein the second wheel support assembly further comprises a third and a fourth roller coupled with the carriage system, the third and fourth roller engaging an interior surface of the second rail member, and wherein no roller engages an exterior surface of the first and second rail members.

17. A camera slider system as defined in claim 1, wherein at least one of the first or second rail members includes at least an endplate hole disposed at an end of the first or second rail members, the endplate hole disposed along a longitudinal axis of the first or second rail members.

18. A camera slider system as defined in claim 17, wherein an endplate is couplable with the first and second rail members via a fastener disposed through the endplate and an endplate hole disposed at an end of the first and second rail members.

19. A means for supporting a camera for longitudinal movement, comprising:
  means for supporting a camera, the means for supporting a camera disposed between at least two longitudinally-oriented rail members, the at least two longitudinally-oriented rail members spaced at a substantially constant distance apart; and
  means for facilitating longitudinal movement of the means for supporting a camera along the at least two longitudinally-oriented rail members, wherein at least a portion of the means for facilitating longitudinal movement of the means for supporting a camera is coplanar with at least a portion of the at least two longitudinally-oriented rail members; and
  means for adjusting one or more distances between at least one of the at least two longitudinally-oriented members and the means for facilitating longitudinal movement of the means for supporting a camera.

20. The means of claim 19, further comprising:
  means for adjusting one or more levels of friction between the means for supporting a camera and at least one of the at least two longitudinally-oriented rail members.

21. A method of providing a camera slider system for supporting a camera for longitudinal movement, comprising:
  obtaining a camera slider system, including at least:
    a track assembly having at least a first and second rail member oriented longitudinally and spaced at a substantially constant distance apart; and
    a carriage system with which a first and second wheel support assembly are coupled, the first and second wheel support assembly laterally spaced adjacent to the first and second rail member, wherein the first and second wheel support assembly further comprises of a plurality of rollers arranged such that the assembly of rollers is coplanar with the first and second rail members;
  adjusting a threaded fastener disposed through a roller to laterally move the roller away from or towards the corresponding rail member until optimal friction is obtained to provide the desired longitudinal movement of the carriage system along the corresponding rail member; and
  adjusting a setscrew to engage the threaded fastener to maintain the optimal friction.

* * * * *